United States Patent
Smith

(10) Patent No.: US 10,648,158 B1
(45) Date of Patent: May 12, 2020

(54) CAGE FOR SUPPORT OF FLEXIBLE PIPES, TUBING, AND LINES

(71) Applicant: Wayne J. Smith, Brookhaven, MS (US)

(72) Inventor: Wayne J. Smith, Brookhaven, MS (US)

( * ) Notice: Subject to any disclaimer, the term of this patent is extended or adjusted under 35 U.S.C. 154(b) by 0 days.

(21) Appl. No.: 16/251,122

(22) Filed: Jan. 18, 2019

(51) Int. Cl.
*F16L 3/00* (2006.01)
*E02F 9/22* (2006.01)
*B60R 16/02* (2006.01)
*F16L 3/01* (2006.01)
*B60R 16/08* (2006.01)
*B60R 16/03* (2006.01)

(52) U.S. Cl.
CPC ........ *E02F 9/2275* (2013.01); *B60R 16/0215* (2013.01); *B60R 16/03* (2013.01); *B60R 16/08* (2013.01); *F16L 3/01* (2013.01)

(58) Field of Classification Search
USPC ..................... 248/63, 65, 74.3; 439/373, 501
See application file for complete search history.

(56) References Cited

U.S. PATENT DOCUMENTS

| | | | |
|---|---|---|---|
| 2,619,888 A | 12/1952 | Young et al. | |
| 2,626,552 A | 1/1953 | Oehler et al. | |
| 2,879,020 A | 3/1953 | Wheeler | |
| 2,861,317 A | 11/1958 | Greeson | |
| 3,930,116 A * | 12/1975 | Richards | H01R 13/60 174/66 |
| 5,032,217 A | 7/1991 | Tanaka | |
| 8,021,174 B1 * | 9/2011 | Schutte | H01R 13/6392 439/144 |
| 8,668,173 B2 | 3/2014 | Knobloch | |
| 9,350,151 B2 * | 5/2016 | Michaelis, IV | H02G 3/14 |

* cited by examiner

*Primary Examiner* — Steven M Marsh
(74) *Attorney, Agent, or Firm* — Francis Lipinski

(57) ABSTRACT

This cage routes and contains flexible lines cleanly, and secures them in a manner such that the flexible lines will not snag on loader treads, or other obstacles. The cage is formed by distinct placement of straight pins and angle pins in a flat bed. The support holder may be used independently, or in sets, to contain ⅜", ½", and ¾" flexible line. Placement is accomplished by an operator placing the line past and over pins and then bending over a final angle pin to finally contain the line within the cage. The line remains contained until an operator extracts the line, when the process is reversed.

13 Claims, 4 Drawing Sheets

CAGE FOR SUPPORT OF FLEXIBLE PIPES, TUBING, AND LINES

CROSS-REFERENCE TO RELATED APPLICATIONS

Not Applicable

BACKGROUND

Field of Invention

This present invention is directed to the art of supports. More particularly, this device progresses the art of supports for flexible pipes, tubing, and flexible lines.

BACKGROUND

The art for this invention is Class 248, Supports, for articles which carry the weight of a fluid handling flexible line, and contain the flexible line against the pull of gravity.

"Suppose you wanted to put an attached implement head on your loader, but the flexible lines that run to the attachment head from the loader are too long or too short?"

It is the primary object of this invention to use flexible line supports to route the flexible lines orderly, and to secure lines in a manner such that the lines will not snag or drag on loader treads, on the ground, or other obstacles.

A further object is to provide directional control of lines to turn to the left or to turn to the right from the support piece.

Although the principles of the invention may have wide application, the principal field to which the invention is applicable is designed primarily for the use of loader-attached implements.

Advancements in the arborist's industry, which uses loaders widely, see new attachments being offered commercially to the public on an increasing frequency. Flexible lines must adapt to the new and different attachments that fit to loader oil pressure sources. As industry dealers, such as Kubota and Bobcat, maximize the number of quick attachments available for commercial use, this line holder is found to be useful with different manufacturer's attachment tools.

In a typical arrangement in this field, a loader is equipped with means for supplying pressurized fluid to a fluid motor located on a loader-attached implement. It is characteristic of loader-attached implements that the fluid motor on the attached implement is located at a point relatively remote from the source of fluid pressure on the loader. The distance between fixed line connections on a loader and the coupling fittings on an attached implement is of variable length because various attached implements are fitted to the loader during different work operations. This variable length may further increase when the attached implement, say a root grapple implement, is opened or closed during the course of usage. Normally, the flexible line attached to the flexible connections on a loader are substantially longer than the normal straight-line longitudinal distance from the pressure source to the attached implement.

In the practice of loader operation's, it is typical to leave a flexible line unsupported, which may cause damage to the line from various means such as rubbing or dragging on loader treads or dragging on the ground.

As there is considerable relative movement between the loader and an attached implement, and because of the work conditions under which the loader and the attached implement operate, there is a likelihood that the lines will be damaged if not properly supported between the loader and an attached implement.

PRIOR ART

The prior art problem encountered is that flexible lines, fixed and connected to a loader, are typically too long or too short for the attached implement on the front of a loader. There may be an extra length of line that can rub against loader tread or could become hung up in shrub or trees. Or, the line may be too short to reach the attached implement.

U.S. Pat. No. 2,619,888, W. A. Young et al., 'Supporting Means for Flexible Conduits in Flexible Control Means', relates to improvements in flexible control systems, and more particularly to means for supporting a flexible fluid-transmitting conduit used between a source of pressure and a remote fluid motor. "Inasmuch as there is considerable relative movement between the tractor and implement because of the conditions under which the tractor and the implement operate, there is considerable likelihood that the hoses will be damaged if not properly supported between the tractor and the implement."

U.S. Pat. No. 2,626,552, W. P. Oehler et al., "Conduit Support For Vehicle Trains With Conduit-Connected Fluid Devices", is a line support improvement where an extension of the flexible line is required. In Oehler, a conduit carrier is provided for extension of the attachment, such as a root grapple attachment head being opened to pick up a tree root. However, where Oehler is for supporting flexible lines only, the Smith invention has two functions: support of the flexible line, and facilitating turning and coiling of flexible line.

U.S. Pat. No. 5,082,217, Parker et al., Flexible Hose Support for an Implement is for coiling, or wrapping uniformly, an excess length of flexible line. When the hoses are disconnected from the tractor, there is a considerable amount of free length at the coupler ends of the hoses which must be routed back over the implement. A hose support includes an upright post connected to a portion of the hitch. The upper portion of the post supports a U-bolt or similar hose confining device.

U.S. Pat. No. 2,861,817, C. B. Greeson, "Line Holder for Separable Fluid Connection Between Vehicles", wherein the slack of the flexible conduits or hoses of flexibly equipped vehicles is taken up and damage resulting from dragging the conduits is substantially lessened.

SUMMARY

"The problem is trying to get the flexible lines to route within a maximum bend radius, and secure them in a manner such that the flexible lines will not snag on loader treads, or other obstacles." Routing flexible lines poses the problem of exceeding the maximum bend radius while stowing the lines with to tight a turn radius. When an initially straight flexible line is bent uniformly, the longitudinal tension and compression, which resist the applied bending moment, also tend to flatten or ovalise the cross-section of flexible line. As the curvature increases, the flexural stiffness of the line decreases. Under steadily increasing curvature, the bending moment reaches a maximum value. After the bending moment reaches its maximum value, the structure becomes unstable, and so, the line suddenly forms a "kink".

The primary object of the flexible line holder device is to hold a flexible line secure in a cage-like structure consisting of pins attached to a plate.

A further objective is to provide a situs to wrap excessive flexible line utilizing a line holder in order to reduce the length of flexible line between a loader and an attached implement.

A still further objective of the flexible line holder device is to facilitate turning the flexible line as the line enters and exits the line holder.

Some attached implements can utilize a short flexible line, while other attached implements require longer lengths of flexible line. This length requirement is due to the nature of the attached implement extending away from the loader when utilized. A root grapple, for example, must open to grab a tree root, requiring sufficient length of flexible line to reach the full range of operating characteristics of the attached implement. Control of excess flexible line length is required when the flexible line is not used by a loader attachment. However, stowage of the extra length of flexible line presents an issue.

Excessive flexible line length may be the source of potential accidents on the worksite. Excess flexible line, not stowed and not protected, is subject to damage from wear and tear. Lines laying everywhere, not stowed, are a mess, and an occupational safety issue.

To keep a work place safe at all times, loader operators make every attempt to put flexible lines in a stable/safe place where damage will not occur. To get the lines out from under foot traffic, the operator may use a line holder, which can be bolted or welded onto a loader.

What is new and unobvious is a device that has the ability to route excessive flexible line in a manner that secures the flexible line both cleanly and safely, while simultaneously having the capability for a loader operator to extend or to retract excess length of line from an attached implement without disturbing the maximum bend radius of the flexible line.

THE DRAWINGS

The objects of this invention and other features, aspects, and advantages will become apparent to those skilled in the art with regard to the following description, appended claims, and accompanying drawings.

Figure 1:
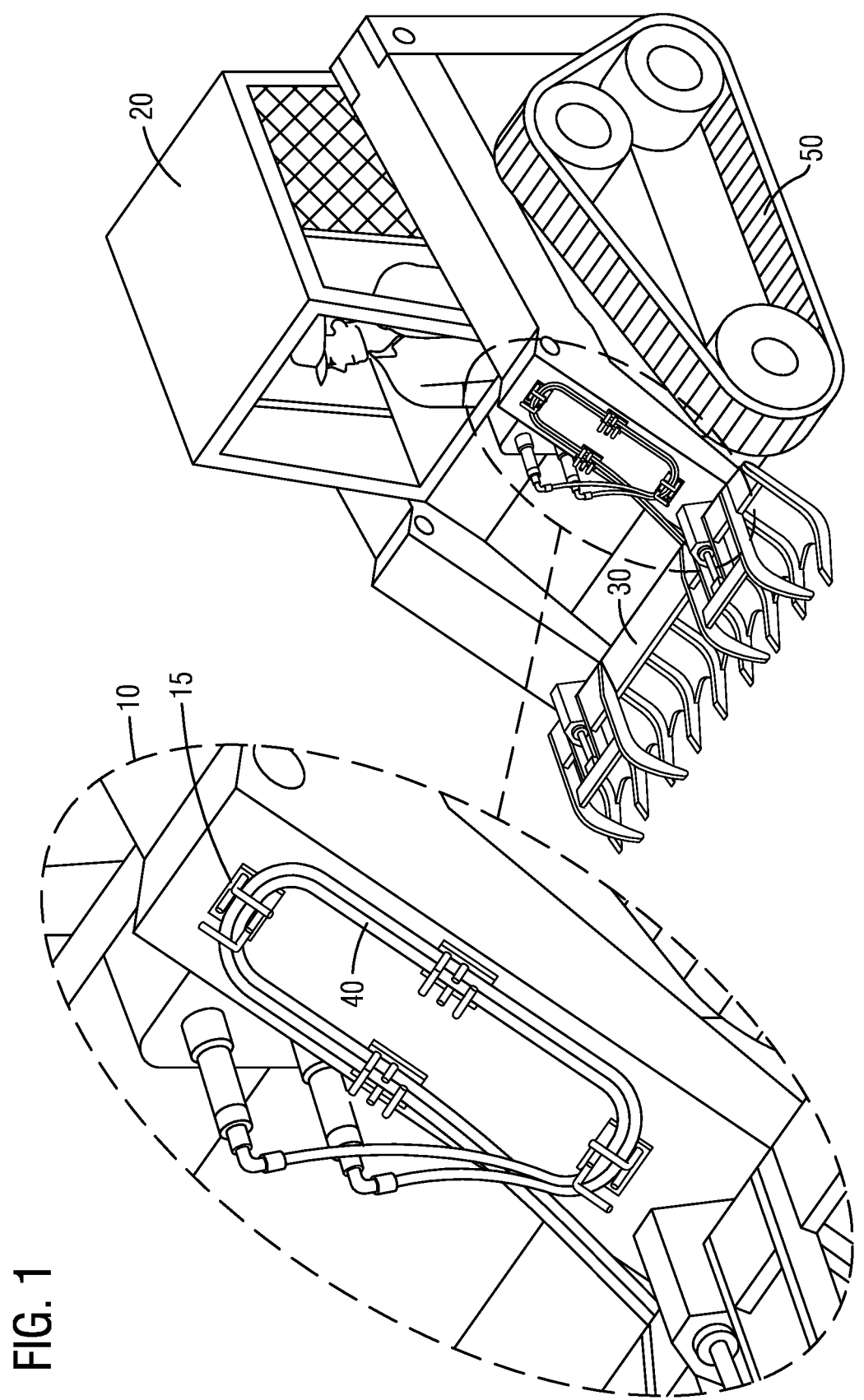
FIG. 1 is a perspective of coiled line on a loader utilizing a root grapple implement, with details of the line holder.

| DRAWINGS Reference Numerals | | | |
|---|---|---|---|
| 10 | Line holder in use on a loader | 15 | Flexible line holder |
| 20 | Loader | 30 | Attached implement |
| 40 | Flexible line | 50 | Loader tread |
| 0 | Angle pin | 65 | Straight pm |
| 70 | Bed, flat | 75 | Receptacles in bed |
| 78 | Weld at pin | | |
| 80 | Critical height | 90 | Side-by-side configuration |
| 100 | Four flexible lines within the line holder device in a side-by-side configuration | 110 | A stacked configuration |
| 140 | a flexible line bent | 130 | A 'kink' |
| 140 | A stacked configuration, making a left turn | 160 | A side-by-side configuration, making a left turn |
| 150 | A stacked configuralion, making a right turn | 170 | A side-by-side conflguiation, making a right turn |

DETAILED DESCRIPTION

Commercially available quick attached implements are common with all loader machines. Each attached implement may have a unique length of flexible line 40 required to operate an implement fluid motor. Specifically, FIG. 1 illustrates the use of a root grapple 30 as an attached implement to a loader 20.

Figure 2:
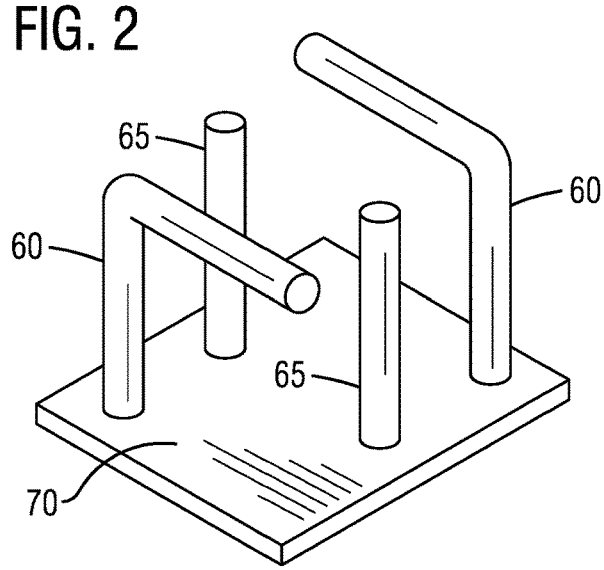
FIG. 2 is a perspective of the hose holder device showing angle pins and straight pins located on a flat bed.
Figure 3:
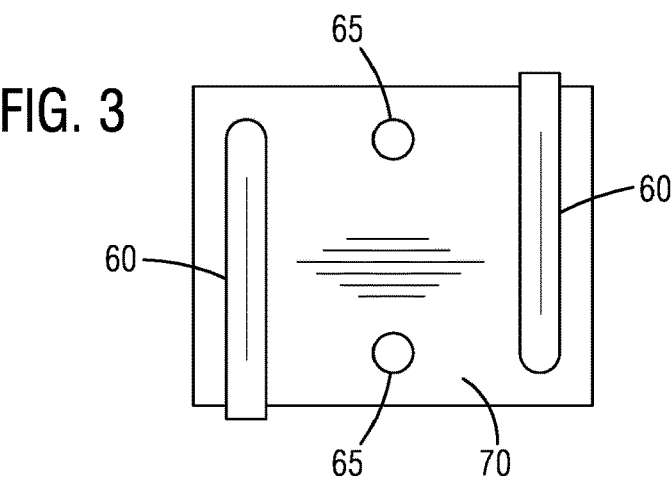
FIG. 3 is a plan view of the line holder device showing a slight overhang of the angled pins.
Figure 4:
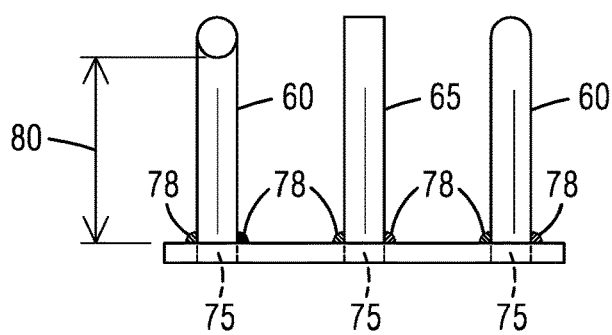
FIG. 4 is a side elevation view of the line holder device depicting a critical height from the top of the bed to the bottom of the angle pin. This height establishes the number of lines that may be installed in the line holder.
Figure 5:
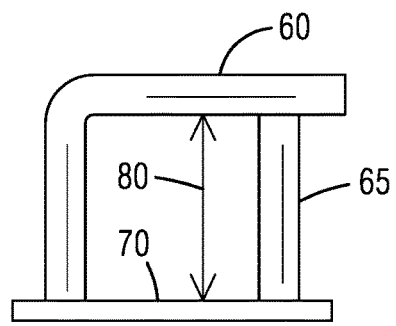
FIG. 5 is an end elevation view of the line holder device depicting a critical height from the top of the bed to the bottom of the angle pin.

When the cage is used for support, a flexible line is contained with: a foundational bed, a set of straight pins 65, and a set of angle pins 60. An angle pin 60 is a pin incorporating a 90-degree angle as depicted in FIG. 2. The angle pins 60 face in an opposite direction from each other and are place at cater-corner positions on the bed. FIG. 1 shows the flexible line holder 15 mounted on loader side panel.

The flexible line holder is unique in form. Arrangement of pin placement functions to form a caged environment to line. Critical pin height ensures line containment, unless the line is specifically bent by the operator for insertion or removal of the flexible line from the holder. The device is composed of three parts: a flat base plate to hold pins, straight pins to corral flexible lines, and angle pins to corral flexible lines, to restrain flexible lines, and allow the lines to be flexed on entering or exiting the holder.

Bed Platform

The flexible line holder has a flat steel plate that acts as a bed foundation for flexible line. The bed is fabricated to an appropriate size corresponding to the pin dimensions utilized to contain flexible lines, and to the number of flexible line pairs to be utilized. A flexible line commonly used will be supported on "flat steel, bed of support. Thicker plate may be utilized for a bed, however A" flat steel will normally suffice for strength. Steel is required to handle the forces of the flexible line caused by high flexible pressures inside the flexible line.

The primary object of the cage is to hold a flexible line secure in a cage-like structure consisting of pins attached to a plate.

A further objective is to provide a situs to wrap excessive flexible line utilizing a line holder in order to reduce the length of flexible line between a loader and an attached implement.

A still further objective of the flexible line holder device is to facilitate turning the flexible line as the line enters and exits the line holder.

Some attached implements can utilize a short flexible line, while other attached implements require longer lengths of flexible line. This length requirement is due to the nature of the attached implement extending away from the loader when utilized. A root grapple, for example, must reach out to grab a tree root, requiring sufficient length of flexible line to reach the end of any extraction of the attached implement. Control of excess flexible line length is required when the flexible line is not used by a loader attachment. But where does the loader operator put extra length of flexible line? FIG. 1 loader. The bed platform is welded or bolted to a loader.

Pins

Figure 6:
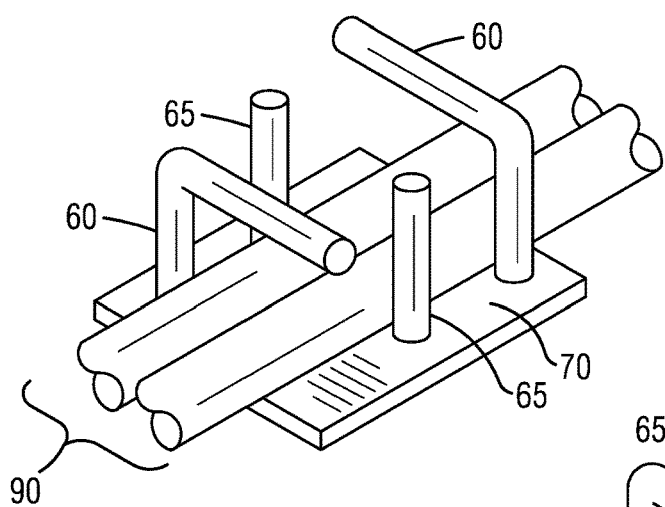
FIG. 6 is a perspective view of the line holder device demonstrating the placement of two flexible lines within the line holder device in a side-by-side configuration.
Figure 6A:
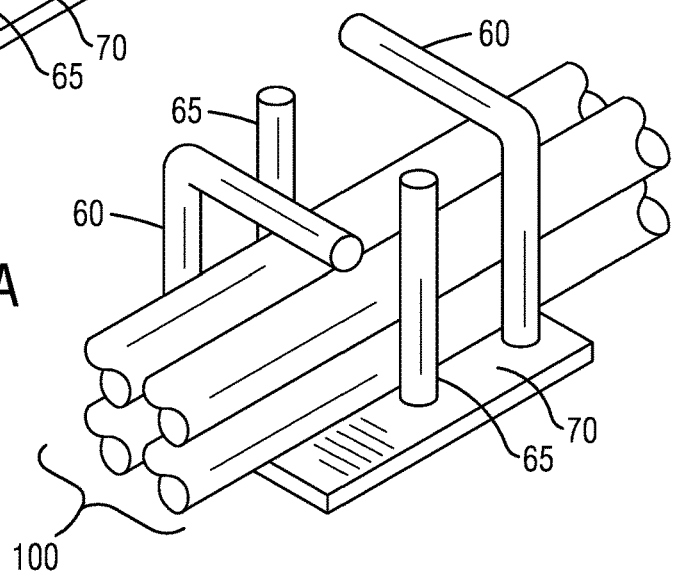
FIG. 6A is a perspective view of the line holder device demonstrating the placement of four flexible lines within the line holder device in a side-by-side configuration.

The flexible line holder incorporates two (2) center straight pins and two (2) angle pins. This device has functionality due to the two center straight pins that are spaced apart to accommodate the number of flexible lines to be utilized. The holder is wider at the bed for horizontal runs of flexible line (see FIG. 6) and narrower, or thinner, for the vertical runs of flexible line holders (see FIG. 7).

Straight pins are a round cylinder of critical height of the distance from the top of the bed to the top on the L-shaped angle pins to keep the flexible line contained below the top of the straight pin. Each pin has shear strength to withstand cyclic pressure force excursions due to operation of attached implement. The pins are welded into receptacles in the bed at distinct locations.

Pins are employed to hold secure and contain excessive length of flexible line as occasioned by use of multiple, and different attached implements, each requiring a different length of flexible line. There are two (2) straight pins per bed. Each straight pin is sited on the bed rising perpendicular to the flat bed. Each pin is seated in a receptacle in the bed. Straight pins are welded (or molded if 3-D molding is used) into receptacles in the bed.

The 2 straight pins are placed in the middle of the side edges of the bed. The straight pins are placed at an opposite side from each other straight pin on the bed. The straight pins are spaced apart at a distance corresponding to: 1) the line diameter of the flexible line used, and 2) the number of attached implements to be used while operating the loader.

With straight pins placed in the bed, in the middle of the side edges, in positions to accommodate specific diameter flexible line, and according to the number of line pairs to be used, then the mass and strength of the straight pin is of a design to contain flexible line moving as a result of loader movements from operating an attached implement on a loader, and the straight pin supports the appropriately sized flexible line during non-pressurized operating times.

Angled pins are a cylindrical rod that is formed/shaped/bent 90 degrees such that the angle pin has a straight and vertical portion, and a straight and horizontal portion. The height of the angle pin is measured in terms of critical height. The critical height is the distance from the top of the bed base to the top edge of the horizontal portion of the angle pin.

Angled pins are employed to contain flexible line moving as a result of loader movements from operating an attached implement on a loader, where containment occurs on the sides of the flexible line which lies on the bed and occurs on the top of the flexible line, as contained by the horizontal portion of the angled pin.

Steel is employed for strength in fabricating the pins to contain flexible line moving as a result of loader movements from operating an attached implement on a loader. A cylindrical rod is employed of sufficient mass and strength to: 1) to contain flexible line moving as a result of loader movements from operating an attached implement on a loader, and 2) withstand repeated cyclic pressure force as a result of loader movements from operating an attached implement on a loader.

There are two (2) angled pins per bed. Each is sited on the bed rising perpendicular to the flat bed. Each pin is seated in a receptacle in the bed. Angled pins are welded (or molded if 3-D molding is used) into the bed.

The 2 angled pins are placed in opposite corners of the bed; that is, the angled pins are placed cater-corner to each other on the bed. The angled pins are spaced apart at a distance corresponding to: 1) the line diameter of the flexible line used, and 2) the number of attached implements to be used while operating the loader.

With angled pins placed in the bed, in the corners of the side edges of the bed, in positions to accommodate specific diameter flexible line, and according to the number of line pairs to be used. The mass and strength of the angled pin is of a design to contain flexible line moving as a result of loader movements from operating an attached implement on a loader, and the angled pin supports the appropriately sized flexible line during non-pressurized operating times.

The top, horizontal portion of the L-shaped, angle pins 60 extend over the base of the bed by approximately ⅛" to 3/16" as a feature to ensure the flexible line does not twist out of the holding device during pressure-pulsing operations.

Stowage and Removal of Flexible Line from a Line Holder

Flexible line is coiled, or turned, to wrap and stow excessive length of line. In the process of stowing excessive line, the flexible line must be turned and twisted to cause a coil or a wrap of line. The flexible line support devices may be used, as a set, to coil excessive length of line on a loader. Depending on the needs of the loader operator, excessive flexible line may be wrapped in turns to the left or in turns to the right.

To place a flexible line in a support device, grasp and lay the flexible line onto the bed under a first angled pin, then proceed to lay the line overtop and past of a straight pin, and then bend the flexible line to get under the remaining angle pin. Check that the flexible line is supported.

To extract the flexible line from the support device, grasp and bend the flexible line away from the bed, overtop of the straight pin, and out and away from the support device.

Once fitted into the holder, the flexible lines will not come out of the caged area because of the pin and their arrangement. The flexible line cannot come out of the caged structure of pins without positive action to remove the flexible line. The flexible line diameters need to be tight inside the device, so that the flexible lines are tight within the caged structure. Because of the tight fit of the cage, the cage is designed to be of one extra diameter of height to accommodate removal the line.

Figure 7:
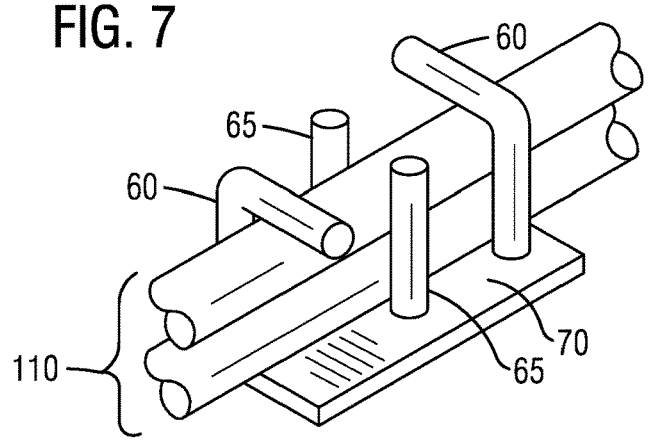
FIG. 7 is a perspective view of the line holder device demonstrating the placement of two flexible lines within the line holder device in a stacked configuration.
Figure 8:
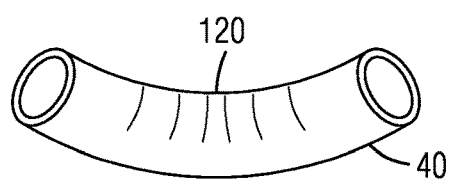
FIG. 8 shows a flexible line bent, but not exceeding a maximum bend radius for the specific line.
Figure 9:
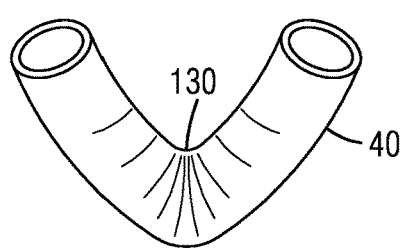
FIG. 9 shows a flexible line bent beyond a maximum bend radius, thus establishing a 'kink' in the line.
Figure 10:
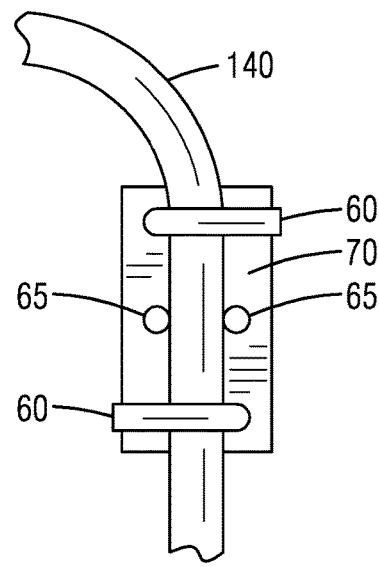
FIG. 10 shows a flexible line, in a stacked configuration, making a left turn against the top angle pin.
Figure 11:
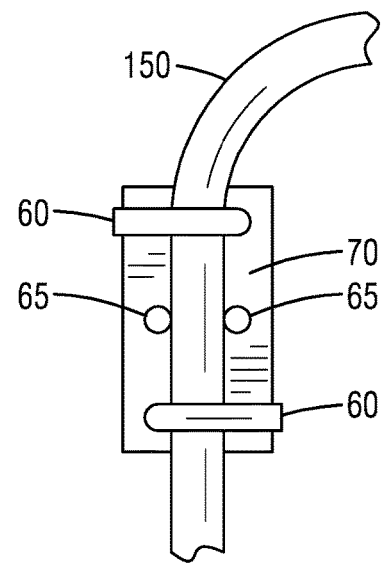
FIG. 11 shows a flexible line, in a stacked configuration, with the flexible lines making a right turn against the top angle pin.
Figure 12:
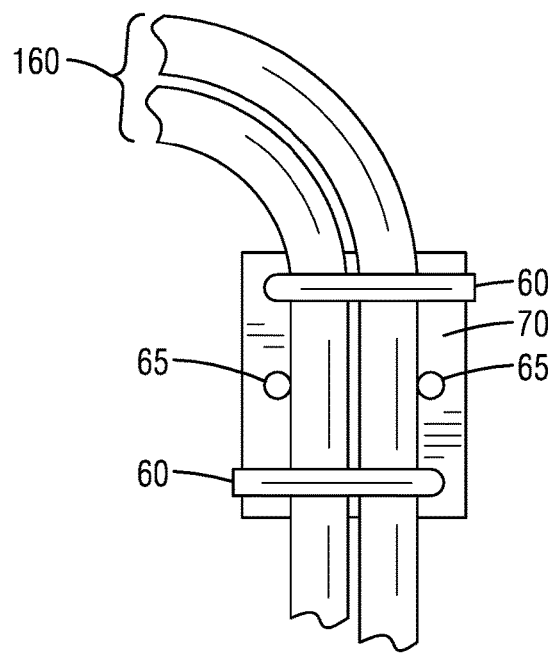
FIG. 12 shows flexible lines in in a stacked configuration, making a left turn against the top angle pin.
Figure 13:
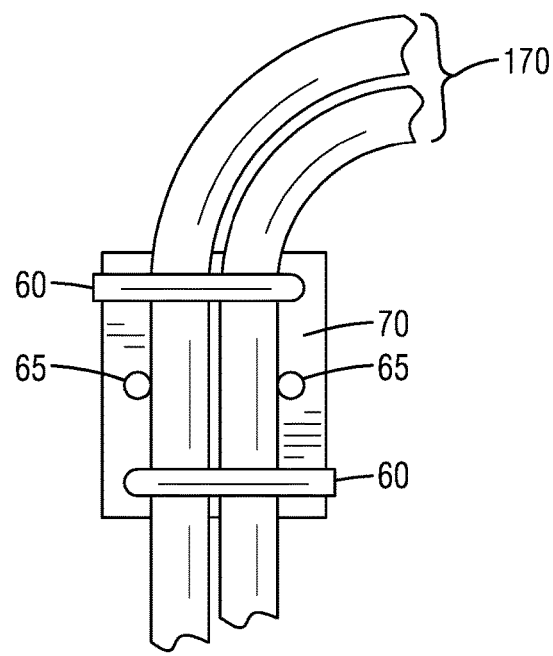
FIG. 13 shows flexible lines in a side-by-side configuration, with the flexible lines making a right turn against the top angle pin.

One pair of vertically run lines, as shown in FIG. 7, has two flexible lines on top of each other, but with no parallel lines, and requires approximately ⅛ inch of clearance to feed the flexible line into the support. A vast majority of loaders in use in the arborist's industry use ⅜" flexible lines for operating attached implements. The flexible line holder is applicable for use with ¼" flexible line, ⅜" line, or ½" line. A loop or coil size is determined by the allowable bend radius of the flexible line in use.

There are various sizes of flexible line holders available. Line holders are designed to accommodate either two, four, or six flexible lines. The vertical distance between the straight center pins establishes the proper device sized to the proper line size. Increasing dimensions of supports are a multiplicative of the original line size. The distance between straight pins varies on different models as more cables need to be added. However, the distance is always a multiplicative amount of the flexible line diameter.

Application/Uses

This flexible line holder is used for storage of extra, or excess, flexible line during connection of pressure sources to various, attached implements having variable length of flexible line. The device is used to hold and contain excessive lengths of flexible line. Also, the device functions to facilitate directional control and turning the flexible line during coiling and uncoiling without violating the maximum bend radius of the flexible line. the line holder can be used anywhere a line needs to be retained.

The flexible line holder can be used with different attached loader implements. The flexible line holder is useful to reduce excessive length of flexible line by routing pressurized flexible line in flexible line holders, regardless of the attached implement.

This fitting of the flexible line within the line holder allows movement of line, while simultaneously supporting the flexible line. Yet, when installed in the cage, the flexible line remains flexible with respect to both the loader and the attached implement. This device contains, above the bed and within the pins, the excess flexible line. Once contained in place by pins, the flexible line holder will not be detrimentally affected by vibration that affects many holding devices which are rigid. The extension of the top horizontal portion of the angle pin over the edge of the bed keeps the flexible line from coming out of the area above the bed, within the constraints of all of the pins.

One of the novel aspects of the Smith flexible line holder is it is made to be of appropriate dimensions corresponding to the size of the flexible line utilizing the line holder.

Spacing and critical height of the device are established by correlating a pair of lines with a line size. The Size Rule of the cage is that one pair of parallel lines requires a holder space above the parallel lines equal to one diameter of that size flexible line. For example, one pair of ¼ inch diameter line in FIG. 6, for a ¼ inch line will require a device with a distance between the straight pins of two (2) diameters of line. For a ¼ inch line, ½ inch of space is required for the width.

Although pin receptacles are required to be welded in the design, the market anticipates fabrication of the flexible line support as metal objects using any of the new technologies for forming parts, such as three-dimensional printers. Other embodiments of the design anticipate plastic support cages, which are useful for electrical coaxial cables.

A pair of flexible lines to operate an attached implement is commonplace in use of with a loader. The Smith flexible line holder is designed and built to accommodate one pair, two pair, or three pair of flexible lines.

CONCLUSION, RAMIFICATIONS AND SCOPE

Although the present invention has been described in considerable detail with reference to certain preferred versions thereof, other versions are possible. Therefore, the spirit and scope of the appended claims should not be limited to the description of the preferred version contained therein.

The reader's attention is directed to all papers and documents which are filed concurrently with this specification and are open to public inspection with this specification, and the contents of all such papers and documents are incorporated herein by reference. All features disclosed in this specification may be replaced by alternative features serving the same, equivalent or similar purpose, unless expressly stated otherwise. Each feature disclosed is one example only of a generic series of equivalent or similar features.

While the above description contains much specificity, these should not be construed as limitations on the scope of any embodiment but as exemplifications of the presently preferred embodiments thereof. Thus, the scope of the invention should be determined by the appended claims and their legal equivalents, not by the examples given.

What I claim is:

1. For use in a loader-attached implement arrangement, wherein said loader and said attached implement each have a fluid-moving device,
    where said devices are interconnected by flexible lines of greater length than a distance between the two devices:
    a cage
    which is a framework for support of said flexible lines consisting of:
    straight pins, and
    angle pins, and
    a bed of flat steel;
    where said straight pins and said angle pins
    corral said flexible lines placed on said bed of steel as a means for supporting and managing said flexible lines.

2. The device of claim 1, where said bed is of the form of a rectangular, flat, metal plate, and of a footprint to accommodate said straight pins, said angle pins, and to fit said flexible lines which are stowed upon said bed.

3. The device of claim 1 wherein said bed is of a thickness to provide a receptacle to accept a cylindrically shaped pin.

4. The device of claim 1 wherein said bed functions as a situs for said straight pins and said angle pins, and where said bed also functions as a base of said cage which contains said flexible line.

5. The device of claim 1, where said straight pins are cylindrically shaped, and bent at a critical height to accommodate said flexible lines, and permit insertion and removal of said flexible lines.

6. The device of claim 1 where a critical height of said straight pin is a distance from the top of said bed to the top of said straight pin.

7. The device of claim 1 wherein said straight pins are sited on said bed, and rise perpendicular to said bed from a receptacle within said bed, and
    where said straight pins are welded into said receptacle in said bed, and
    where said straight pins are placed in the middle of the side edges of said bed, and
    where said straight pins are placed at an opposite side of said bed from each other said straight pin,
    and where said straight pins are spaced apart at a distance corresponding to a line diameter of said flexible lines utilized, and also corresponding to a number of said attached implements utilized while operating said loader.

8. The device of claim 1 wherein said straight pins function to contain, within said cage, said flexible lines moving as a result of loader movements from operating a said attached implement on said loader.

9. The device of claim 1, where said angle pins are cylindrically shaped, and formed with a 90-degree bend at a critical height such that said angle pin has a straight, vertical portion and a straight horizontal portion.

10. The device of claim 1 where a critical height of said angle pin is a distance from the top of said bed to a bottom edge of said horizontal portion of said angle pin.

11. The device of claim 1 wherein said angle pins are sited on said bed, and rise perpendicular to said bed from said receptacle within said bed, and where said angle pins are welded into said receptacle in said bed, and where said angle pins are placed in opposite corners of said bed, and where said angle pins are placed cater-corner to each other said angle pin.

12. The device of claim 1 wherein a vertical portion of said angle pins function to contain said flexible lines moving as a result of said loader movements from operating a said attached implement on said loader.

13. The device of claim 1 wherein a horizontal portion of said angle pin functions to further contain said flexible lines moving as a result of said loader movements from operating said attached implement on said loader.

\* \* \* \* \*